United States Patent
Naserian et al.

(10) Patent No.: US 10,346,705 B2
(45) Date of Patent: Jul. 9, 2019

(54) METHOD AND APPARATUS FOR ESTIMATING ARTICULATION ANGLE

(71) Applicant: GM GLOBAL TECHNOLOGY OPERATIONS LLC, Detroit, MI (US)

(72) Inventors: Mohammad Naserian, Windsor (CA); Shuqing Zeng, Sterling Heights, MI (US); Allan Lewis, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 240 days.

(21) Appl. No.: 15/628,030

(22) Filed: Jun. 20, 2017

(65) Prior Publication Data

US 2018/0365509 A1    Dec. 20, 2018

(51) Int. Cl.

| | |
|---|---|
| *B60D 1/36* | (2006.01) |
| *G06K 9/32* | (2006.01) |
| *B60R 1/00* | (2006.01) |
| *H04N 7/18* | (2006.01) |
| *B60D 1/62* | (2006.01) |
| *G06K 9/20* | (2006.01) |
| *B60D 1/40* | (2006.01) |

(52) U.S. Cl.
CPC .......... *G06K 9/3208* (2013.01); *B60D 1/36* (2013.01); *B60D 1/62* (2013.01); *B60R 1/00* (2013.01); *B60R 1/003* (2013.01); *H04N 7/181* (2013.01); *B60D 1/40* (2013.01); *B60R 2300/808* (2013.01); *G06K 9/2009* (2013.01); *H04N 7/183* (2013.01)

(58) Field of Classification Search
CPC .. B60D 1/36; B60D 1/40; B60R 1/003; B60R 2300/808
See application file for complete search history.

(56) References Cited

U.S. PATENT DOCUMENTS

| | | | |
|---|---|---|---|
| 2014/0058614 A1* | 2/2014 | Trombley | B60R 1/00 701/29.1 |
| 2014/0160276 A1* | 6/2014 | Pliefke | B60R 1/00 348/118 |
| 2016/0052548 A1* | 2/2016 | Singh | B60D 1/36 701/37 |
| 2016/0272024 A1* | 9/2016 | Bochenek | B60D 1/36 |
| 2019/0016264 A1* | 1/2019 | Potnis | B60D 1/245 |
| 2019/0084620 A1* | 3/2019 | Zhang | B60R 1/003 |

* cited by examiner

Primary Examiner — Tony H Winner (57) ABSTRACT

A method and apparatus for trailer recognition are provided. The method includes detecting a face of a trailer in a first and second image, taken at first and second distances respectively, generating a bounding box around the face of the trailer in the first and second images, determining a first and second set of feature points in the bounding boxes of the first and second images, determining a correspondence between the first set of feature points and the second set of feature points and a correspondence between corners of the bounding boxes and estimating at least one dimension of the trailer by performing a least squares analysis to solve for three-dimensional real world coordinates of the first and second set of features points and the corners of the bounding boxes. The method may assist an operator of a vehicle in aligning the vehicle hitch with a trailer coupler.

20 Claims, 6 Drawing Sheets

*Fig-6B*

METHOD AND APPARATUS FOR ESTIMATING ARTICULATION ANGLE

INTRODUCTION

Apparatuses and methods consistent with exemplary embodiments relate to detecting trailers and assisting operators that are coupling vehicle hitches to trailer couplers. More particularly, apparatuses and methods consistent with exemplary embodiments relate to providing a rear view video to assist a vehicle operator with trailer coupling.

SUMMARY

One or more exemplary embodiments provide a method and an apparatus that detect may determine the dimensions of a trailer based on a video and a position of the trailer with respect to a vehicle. More particularly, one or more exemplary embodiments provide a method and an apparatus that may determine the dimensions of the trailer, the distance between the trailer and the vehicle, and an articulation angle of the trailer.

According to an exemplary embodiment, a method for trailer recognition is provided. The method includes detecting a face of a trailer based on a first image of the trailer taken at a first distance and generating a first bounding box around the detected face of the trailer in the first image, detecting the face of trailer based on a second image of the trailer taken at a second distance and generating a second bounding box around the detected face of the trailer in the second image, determining a first set of feature points in the first bounding box and a second set of feature points in the second bounding box that correspond to the first set of feature points, determining a correspondence between the first set of feature points and the second set of feature points and a correspondence between corners of the first bounding box and corners of the second bounding box, and estimating at least one dimension of the trailer by performing a least squares analysis to solve for three-dimensional real world coordinates of the first and second set of features points and the corners of the first and second bounding boxes.

The method may also include determining an articulation angle of the trailer with respect to a line through a center of the vehicle based on the estimated at least one dimension and the three-dimensional real world coordinates.

The articulation angle may be determined from the estimated at least one dimension and a distance between the trailer and the vehicle. The estimated at least one dimension may be a width of the trailer.

The distance may be determined from information provided by at least one from among an accelerometer, a speedometer, an ultrasonic sensor, an odometer, a radar sensor, and a wheel speed sensor.

The determining the articulation angle may include determining the articulation angle based on the three-dimensional real world coordinates.

The estimated at least one dimension may be a height and a width of the trailer.

The method may further include receiving the first image of the trailer taken at the first distance and the second image of the trailer taken at the second distance from a camera facing a rear of the vehicle.

The camera may be a center high mount stop lamp (CHMSL) camera.

The determining the correspondence between the first set of feature points and the second set of feature points may include determining a rotation matrix corresponding to an articulation angle of the trailer with respect to a line through a center of the vehicle. The correspondence between the first set of feature points and the second set of feature points and the correspondence between the corners of the first bounding box and the corners of the second bounding box may be determined based on the rotation matrix.

According to an exemplary embodiment, an apparatus for trailer recognition is provided. The apparatus includes: at least one memory comprising computer executable instructions; and at least one processor configured to read and execute the computer executable instructions. The computer executable instructions may cause the at least one processor to detect a face of a trailer based on a first image of the trailer taken at a first distance and generate a first bounding box around the detected face of the trailer in the first image, detect the face of trailer based on a second image of the trailer taken at a second distance and generate a second bounding box around the detected face of the trailer in the second image, determine a first set of feature points in the first bounding box and a second set of feature points in the second bounding box that correspond to the first set of feature points, determine a correspondence between the first set of feature points and the second set of feature points and a correspondence between corners of the first bounding box and corners of the second bounding box, and estimate at least one dimension of the trailer by performing a least squares analysis to solve for three-dimensional real world coordinates of the first and second set of features points and the corners of the first and second bounding boxes.

The computer executable instructions may cause the at least one processor to determine an articulation angle of the trailer with respect to a line through a center of the vehicle based on the estimated at least one dimension.

The computer executable instructions may cause the at least one processor to determine the articulation angle based on the estimated at least one dimension and a distance between the trailer and the vehicle. The estimated at least one dimension may be a width of the trailer.

The computer executable instructions may cause the at least one processor to determine the distance from information provided by at least one from among an accelerometer, a speedometer, an ultrasonic sensor, an odometer, a radar sensor, and a wheel speed sensor.

The computer executable instructions may cause the at least one processor to determine the articulation angle based on the three-dimensional real world coordinates.

The estimated at least one dimension may be a height and a width of the trailer.

The apparatus may further include a camera facing a rear of the vehicle. The computer executable instructions may cause the at least one processor to receive the first image of the trailer taken at the first distance and the second image of the trailer taken at the second distance from the camera. The camera may be a center high mount stop lamp (CHMSL) camera.

The computer executable instructions may cause the at least one processor to determine the correspondence between the first set of feature points and the second set of feature points by determining a rotation matrix corresponding to an articulation angle of the trailer with respect to a line through a center of the vehicle. The correspondence between the first set of feature points and the second set of feature points and the correspondence between the corners of the first bounding box and the corners of the second bounding box may be determined based on the rotation matrix.

The computer executable instructions may also cause the at least one processor to estimate at least one dimension of the trailer based on a focal length of a camera that captured the first image and the second image.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

An apparatus and method that recognize a trailer and determine an articulation angle will now be described in detail with reference to FIGS. 1-6B of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles such as trucks include trailer hitches that serve as attachment points for trailers that are towable by the vehicle. Some trailers that may be towed by a vehicle include a fifth-wheel type, a gooseneck type, or a low mount coupler type trailer. To attach a trailer to vehicle, an operator must guide the vehicle so that a hitch located in the bed of the vehicle or located on the back of the vehicle aligns with the coupler of the trailer. Often times, the process of aligning the hitch of the vehicle with the trailer coupler requires repeatedly entering and exiting the vehicle, or the guidance of another person standing outside of the vehicle.

To address the above issue, operators of a vehicle may view an image provided by a rear view camera or a rear-facing camera. The image may be used by an operator to guide the vehicle. However, rear facing or rear view cameras that provide an image view alone may lack other information such as distance to trailer, trailer angle, and trailer dimensions. Thus, providing additional information to an operator of a vehicle or vehicle systems used to align a vehicle with a trailer may be helpful to the alignment and attachment process, and to an operator of a vehicle.

Figure 1:
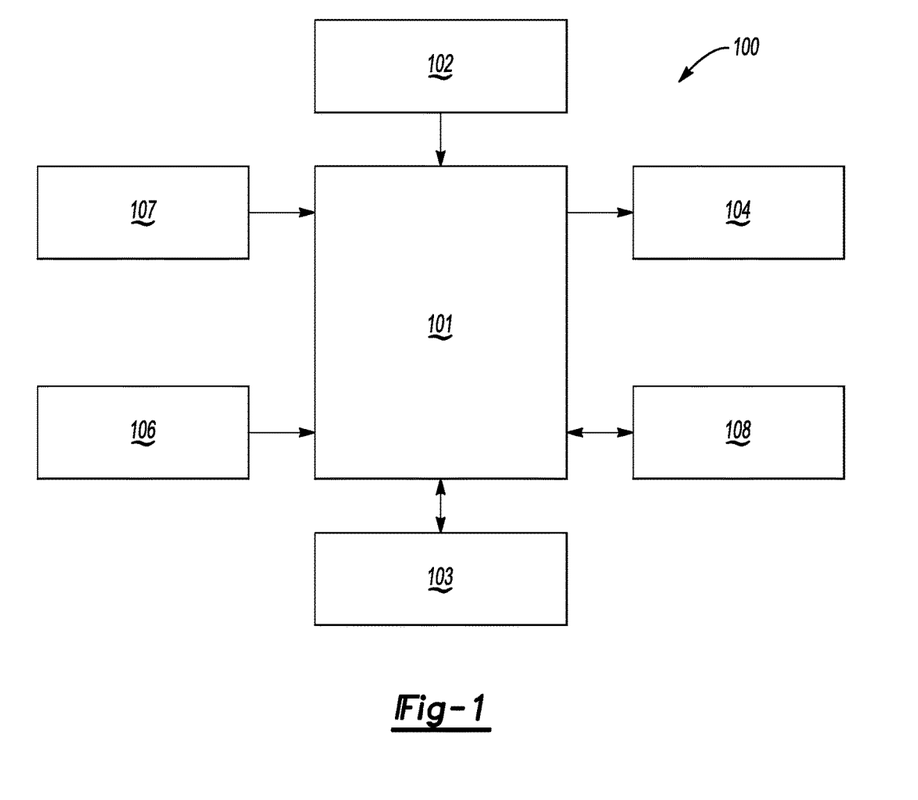
FIG. 1 shows a block diagram of an apparatus that recognizes a trailer according to an exemplary embodiment.

FIG. 1 shows a block diagram of an apparatus for trailer recognition and providing trailer information 100 (i.e., an apparatus for trailer recognition) according to an exemplary embodiment. As shown in FIG. 1, the apparatus for trailer recognition 100, according to an exemplary embodiment, includes a controller 101, a power supply 102, a storage 103, an output 104, a user input 106, a trailer detection sensor 107, and a communication device 108. However, the apparatus for trailer recognition 100 is not limited to the aforementioned configuration and may be configured to include additional elements and/or omit one or more of the aforementioned elements. The apparatus for trailer recognition 100 may be implemented as part of a vehicle, as a standalone component, as a hybrid between an on vehicle and off vehicle device, or in another computing device.

The controller 101 controls the overall operation and function of the apparatus for trailer recognition 100. The controller 101 may control one or more of a storage 103, an output 104, a user input 106, a trailer detection sensor 107, and a communication device 108 of the apparatus for trailer recognition 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the trailer detection sensor 107, and the communication device 108 of the apparatus for trailer recognition 100. The information may be sent and received via a bus or network, or may be directly read or written to/from one or more of the storage 103, the output 104, the user input 106, the trailer detection sensor 107, and the communication device 108 of the apparatus for trailer recognition 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

According to an example, the controller 101 may receive information from one or more from among an accelerometer, a speedometer, an ultrasonic sensor, an odometer, a radar sensor, and a wheel speed sensor. The information from one or more of an accelerometer, a speedometer, an ultrasonic sensor, an odometer, a radar sensor, and a wheel speed sensor may be used to determine a distance traveled by a vehicle or a distance from a vehicle to a trailer.

The power supply 102 provides power to one or more of the controller 101, the storage 103, the output 104, the user input 106, the trailer detection sensor 107, and the communication device 108, of the apparatus for trailer recognition 100. The power supply 102 may include one or more from among a battery, an outlet, a capacitor, a solar energy cell, a generator, a wind energy device, an alternator, etc.

The storage 103 is configured for storing information and retrieving information used by the apparatus for trailer recognition 100. The storage 103 may be controlled by the controller 101 to store and retrieve information received from the trailer detection sensor 107. The information may include information on a trailer detected by the trailer detection sensor 107, image information of images taken by the trailer detection sensor 107, information of an accelerometer, a speedometer, an ultrasonic sensor, an odometer, a radar sensor, or a wheel speed sensor, and/or information indicating whether a vehicle will be coupling with a trailer. The storage 103 may also include the computer instructions configured to be executed by a processor to perform the functions of the apparatus for trailer recognition 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for trailer recognition 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may indicate that the vehicle is in hitching mode or attempting to hitch with a trailer. In addition, the output 104 may output an image from the rear of a vehicle showing the bed of the vehicle and/or an area behind the vehicle including a trailer to which the vehicle is attempting to hitch. The image from the rear of the vehicle may be processed or may be adjusted to include a graphic corresponding to an articulation angle of a trailer with respect to a line through a center of the vehicle, a graphic corresponding to distances between edges of a trailer and a part of a vehicle (e.g., a vehicle cabin), or a graphic corresponding to trailer dimensions.

The user input 106 is configured to provide information and commands to the apparatus for trailer recognition 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to activate a trailer detection algorithm or activate a hitching mode of the apparatus for trailer recognition 100.

The trailer detection sensor 107 may include one or more from among a plurality of sensors including an imaging sensor, a camera, a laser sensor, an ultrasonic sensor, an infrared camera, a LIDAR, a radar sensor, an ultra-short range radar sensor, an ultra-wideband radar sensor, and a microwave sensor. The trailer detection sensor 107 may provide one or more images from one or more rear-facing cameras that may be analyzed to determine whether an operator of a vehicle intends to couple a hitch on a bed of the vehicle with a trailer, analyzed to identify a trailer and/or analyzed to identify a coupler of a trailer.

In addition, other types of information such as distance, infrared images, speed, velocity, acceleration, direction of travel, distance or travel, distance between a trailer and a vehicle or vehicle camera, focal length of a camera etc., from other types of sensors may be provided. For example, information of an accelerometer, a speedometer, an ultrasonic sensor, an odometer, a radar sensor, or a wheel speed sensor, etc. The storage 103 may also include the computer instructions configured to be executed by a processor to perform the functions of the apparatus for trailer recognition 100. The information may be processed to determine whether an operator of a vehicle intends to couple a hitch on a bed of the vehicle with a trailer, determine a type of trailer, determine a position of a trailer, determine information about the movement of a vehicle such as velocity and/or trajectory, or determine whether a gate of a bed of a vehicle is open.

The communication device 108 may be used by the apparatus for trailer recognition 100 to communicate with various types of external apparatuses according to various communication methods. The communication device 108 may be used to send/receive information including information on a trailer detected by the trailer detection sensor 107, information from the trailer detection sensor 107 such as image information, information on vehicle dynamics such as vehicle velocity and vehicle trajectory, information of an accelerometer, a speedometer, an ultrasonic sensor, an odometer, a radar sensor, or a wheel speed sensor, and/or information indicating whether a vehicle will be coupling with a trailer. The storage 103 may also include the computer instructions configured to be executed by a processor to perform the functions of the apparatus for trailer recognition 100 and/or information indicating whether a vehicle will be coupling with a trailer, to/from the controller 101 of the apparatus for trailer recognition 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus for trailer recognition 100 may be configured to detect a face of a trailer based on a first image of the trailer taken at a first distance and generate a first bounding box around the detected face of the trailer in the first image, detect the face of trailer based on a second image of the trailer taken at a second distance and generate a second bounding box around the detected face of the trailer in the second image, determine a first set of feature points in the first bounding box and a second set of feature points in the second bounding box that correspond to the first set of feature points, determine a correspondence between the first set of feature points and the second set of feature points and a correspondence between corners of the first bounding box and corners of the second bounding box, and estimate at least one dimension of the trailer by performing a least squares analysis to solve for three-dimensional real world coordinates of the first and second set of features points and the corners of the first and second bounding boxes.

The estimated at least one dimension may be a height and width of the trailer. The feature points may correspond to edges of a trailer, objects on the trailer, features of the trailer, or other visually perceptible features disposed on a face of the trailer.

The controller 101 of the apparatus for trailer recognition 100 may be configured to determine an articulation angle of the trailer with respect to a line through a center of the vehicle based on the estimated at least one dimension and/or the three-dimensional real world coordinates.

The controller 101 of the apparatus for trailer recognition 100 may be configured to determine the articulation angle based on a distance between the trailer and the vehicle and the width of the trailer.

The controller 101 of the apparatus for trailer recognition 100 may be configured to determine the distance from information provided by at least one from among an accelerometer, a speedometer, an ultrasonic sensor, an odometer, a radar sensor, and a wheel speed sensor.

The controller 101 may also be configured to receive the first image of trailer taken at the first distance and the second image of trailer taken at the second distance from a camera facing a rear of a vehicle. The camera may be a center high mount stop lamp (CHMSL) camera.

The controller 101 may also be configured to determine the correspondence between the first set of feature points and the second set of feature points by determining a rotation matrix corresponding to an articulation angle of the trailer with respect to a line through a center of the vehicle. The correspondence between the first set of feature points and the second set of feature points and the correspondence between the corners of the first bounding box and the corners of the second bounding box may be determined based on the rotation matrix.

Figure 2:
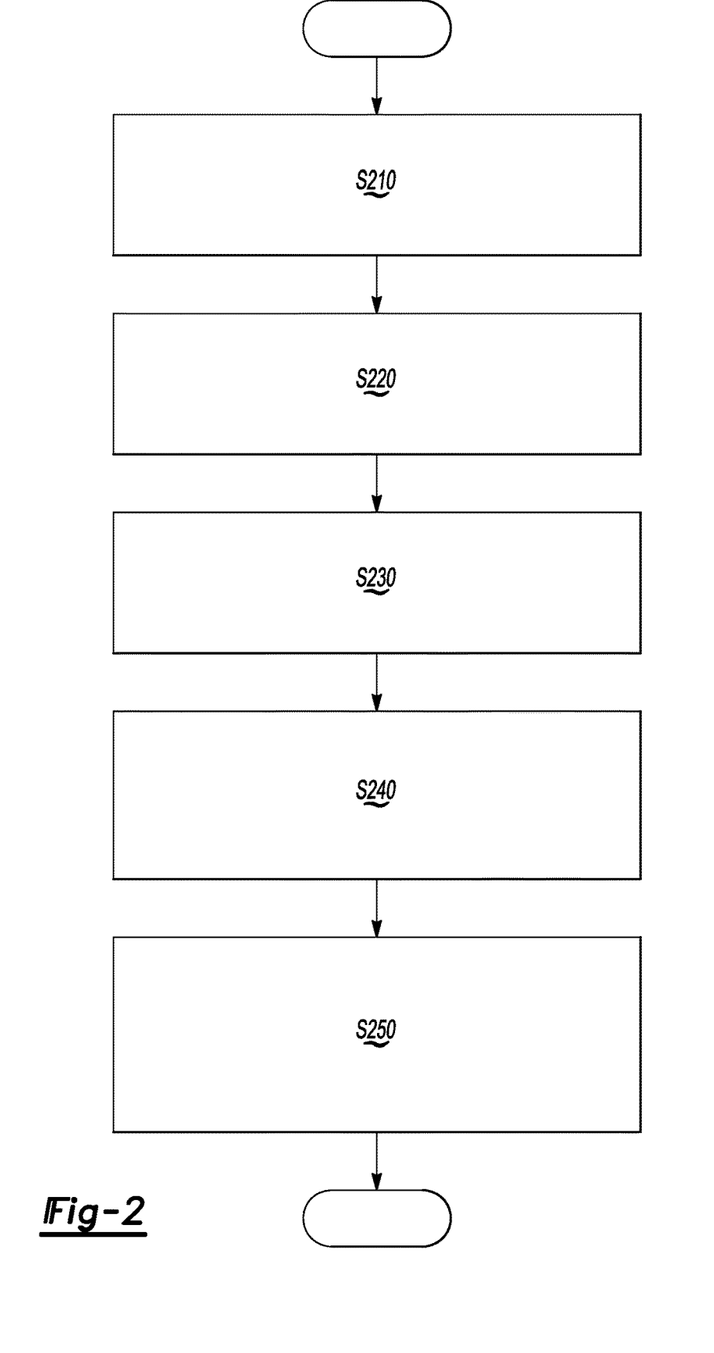
FIG. 2 shows a flowchart for a method of trailer recognition according to an exemplary embodiment.

FIG. 2 shows a flowchart for a method of trailer recognition according to an exemplary embodiment. The method of FIG. 2 may be performed by the apparatus for trailer recognition 100 or may be encoded into a computer readable medium as instructions that are executable by a computer to perform the method.

Referring to FIG. 2, a face of a trailer based on a first image of the trailer taken at a first distance is detected and a first bounding box around the detected face of the trailer in the first image is generated in operation S210. The face of trailer based on a second image of the trailer taken at a second distance is detected and a second bounding box around the detected face of the trailer in the second image is detected in operation S220. In operation S230, a first set of feature points in the first bounding box and a second set of feature points in the second bounding box that correspond to the first set of feature points are determined. Operations S210-S230 may be repeated until enough sample images are captured to perform a least squares analysis.

In operation S240, a correspondence between the first set of feature points and the second set of feature points and a correspondence between corners of the first bounding box and corners of the second bounding box are determined. Then, at least one dimension of the trailer is estimated by performing a least-squares analysis to solve for three-dimensional real world coordinates of the first and second set of features points and the corners of the first and second bounding boxes in operation S250.

Figure 3:
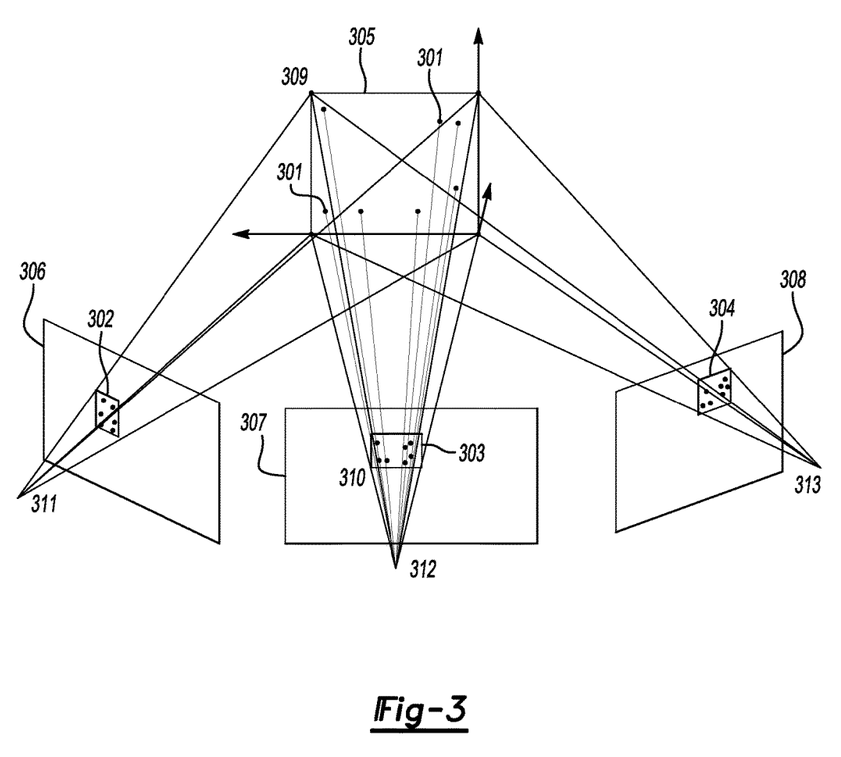
FIG. 3 shows an illustration of detecting feature points in an image of a trailer according to an aspect of an exemplary embodiment.

FIG. 3 shows an illustration of detecting feature points in an image of a trailer according to an aspect of an exemplary embodiment. Referring to FIG. 3, images 306-308, perspectives 311-313 and bounding boxes 302-304 respectively corresponding to the images and perspectives are shown. The projection matrix for each of the perspectives may be used to determine a real world perspective 305 based real world three dimensional coordinates 309 of feature points 301 and 310.

In one example, if feature points (N) are detected in all snapshots (K), we have 2NK measurements. Each feature point contributes two measurements. The number of unknowns is determined by the equation 3K+2N, three variables per snapshot (K) and two variables for each feature point (N) in y-z plane. Thus, if 2NK≥3K+2N, i.e., the number of measurements are larger than the number of unknowns, we can find out the position of feature points in y-z plane, and the width and height of the trailer can be derived from the position of the feature points.

Accordingly, if the number of measurements are greater than the number of unknowns a least-squares algorithm may be applied to solve for the real world three dimensional coordinates of a feature point by minimizing $\min\|z_{ij}-P_iX_j\|^2$, where $z_{ij}$ is a feature point in bounding box of an image, $P_i$ is a projection matrix, $X_j$ is a real world three dimensional coordinate of a feature point.

Assuming a truck moves on flat ground, the projection matrix $P_i$ may be determined by the equation: $P_i=P[R_i|t_i]$, where $t_i$ is the position of the camera $(x_i, y_i, h)$ with h being the height of the camera, rotation matrix $R_i$ determined by trailer's articulation angle $\varphi_i$, e.g., $R_i=I$ for zero aiming angle, P is camera projection matrix (constant), derived from camera's intrinsic and extrinsic parameters. In one example, the P constant may be set based on a camera's focal length, image resolution, camera mounting position and/or angle (e.g., 3 Euler Angles and 3-D Real World Position). According to an example, the projection matrix is determined by the following equation:

$$[R_i | t_i] = \begin{bmatrix} \cos\varphi_i & -\sin\varphi_i & 0 & x_i \\ \sin\varphi_i & \cos\varphi_i & 0 & y_i \\ 0 & 0 & 1 & h \end{bmatrix}.$$

Figure 4:
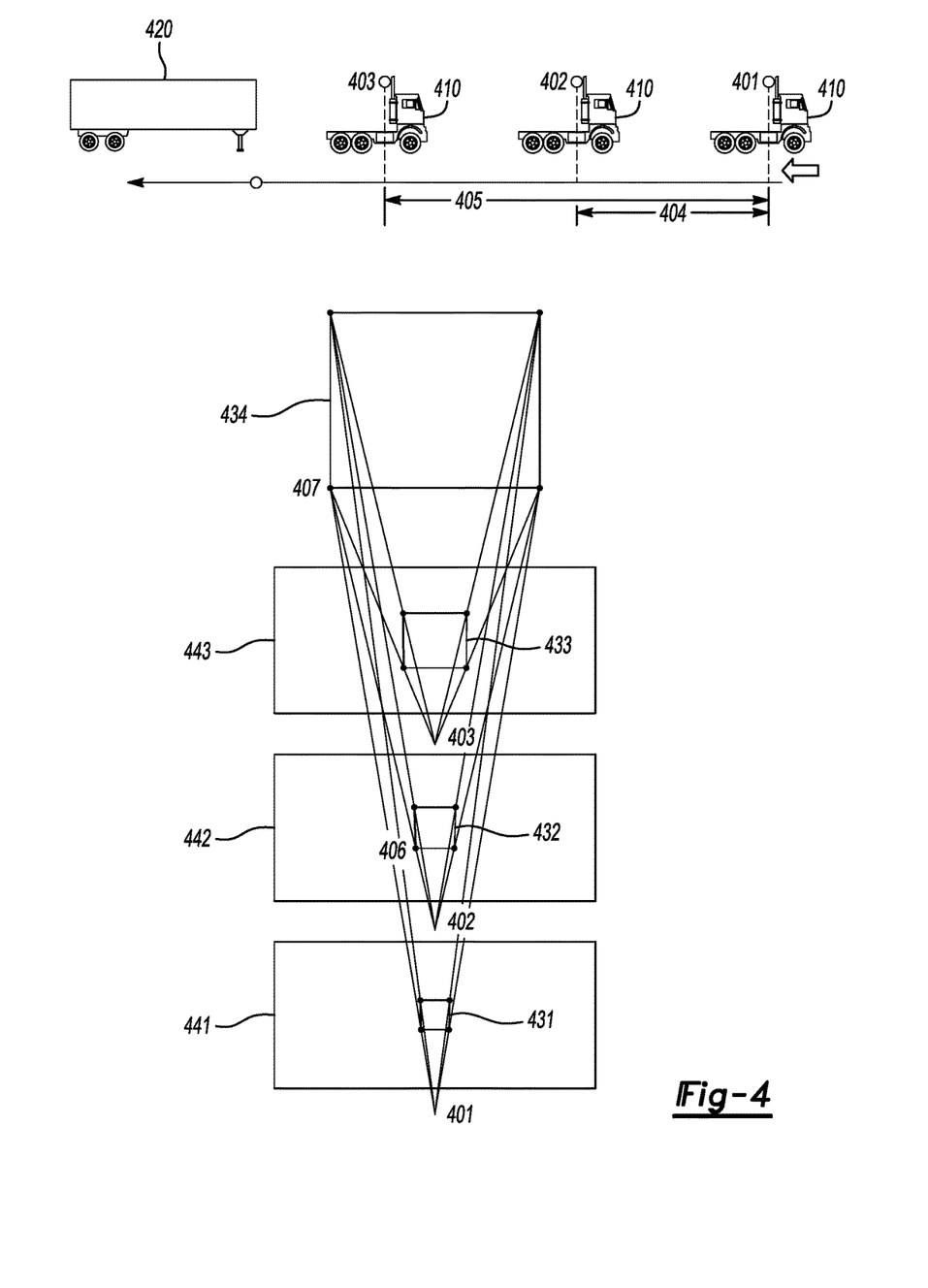
FIG. 4 shows illustrations of determining a bounding box at various distances from a trailer views according to an aspect of an exemplary embodiment.

FIG. 4 shows illustrations of determining a bounding box at various distances from a trailer views according to an aspect of an exemplary embodiment.

Referring to FIG. 4, the dimensions of the trailer 420 may be determined during a straight back maneuver by vehicle 410, e.g., when a vehicle 410 is moving backwards and straight towards the trailer 420. As shown in FIG. 4, three images 441-443 showing different perspectives 401-403 of the trailer are taken at three different distances from the trailer. A bounding box from among the plurality of bounding boxes 431-433 may correspond to each perspective.

The correspondence between a point 406 (e.g., a corner of a bounding box) in the plurality of bounding boxes 431-433 may be determined. This correspondence may be used to determine a real world three-dimensional coordinate 407 of the point. This may be applied to all corners of the bounding box to determine real world three-dimensional coordinates of all corners of the bounding box.

For example, if we have three snapshots or images, we could determine real world three-dimensional coordinates of the corners of the bounding box. Knowing the height of the camera, displacement between the first and second image 404 and displacement between the second and third image 405, we would apply a least squares analysis on the nine unknown variables: distance in the first image 441 and (x, y) coordinates of corners of bounding boxes 432 and 433. The least squares analysis would enable us to determine a real world three-dimensional coordinate 434 of a corner or a feature point 407.

Figure 5:
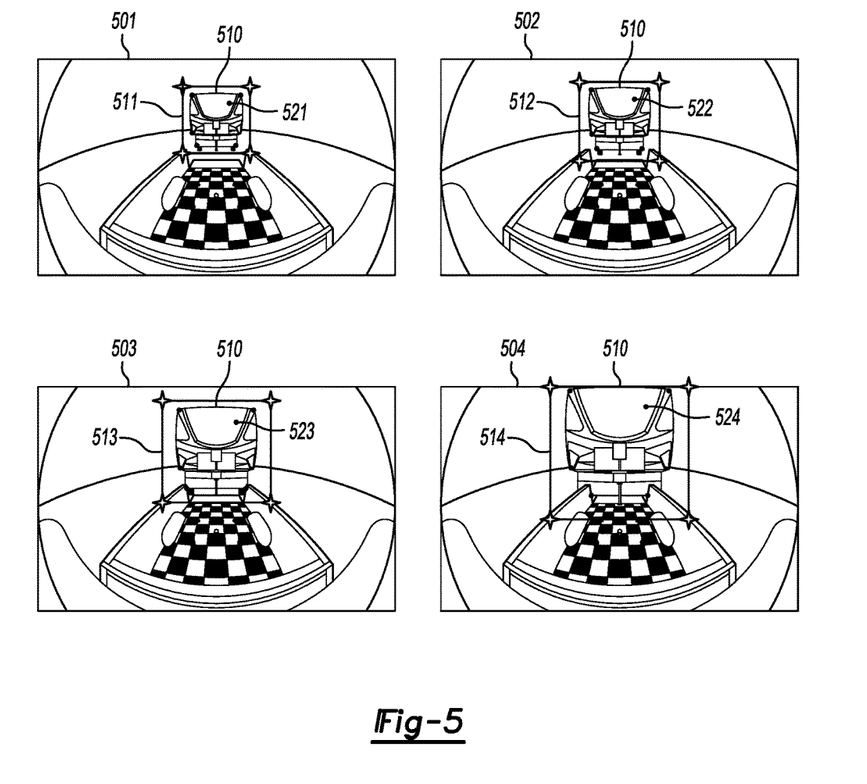
FIG. 5 shows images of determining a bounding box and feature points at various distances from a trailer views according to an aspect of an exemplary embodiment.

FIG. 5 shows images of determining a bounding box and feature points at various distances from a trailer views according to an aspect of an exemplary embodiment. Referring to FIG. 5, a plurality of images 501-504 taken from various distances between a vehicle and trailer 510. As shown in each of the plurality of images 501-504, a plurality bounding boxes 511-514 corresponding to the face of the trailer are generated and a plurality of feature points 521-524 are detected.

As the distance between a vehicle and trailer 510 decreases from image 501-504, the bounding boxes increase in size (e.g., size of 514>size of 513>size of 512>size of 511). Moreover, the distance between the feature points 521-524 increases and the position of features points 521-524 with respect to the image frame changes. This distance between the feature points 521-524 in each image, the position of the feature points 521-524 in each image, the dimensions of the bounding boxes 511-5214 and positions of corners of the bounding boxes 511-514 may be used to determine a distance between a part of a vehicle and the trailer 510.

Figure 6A:
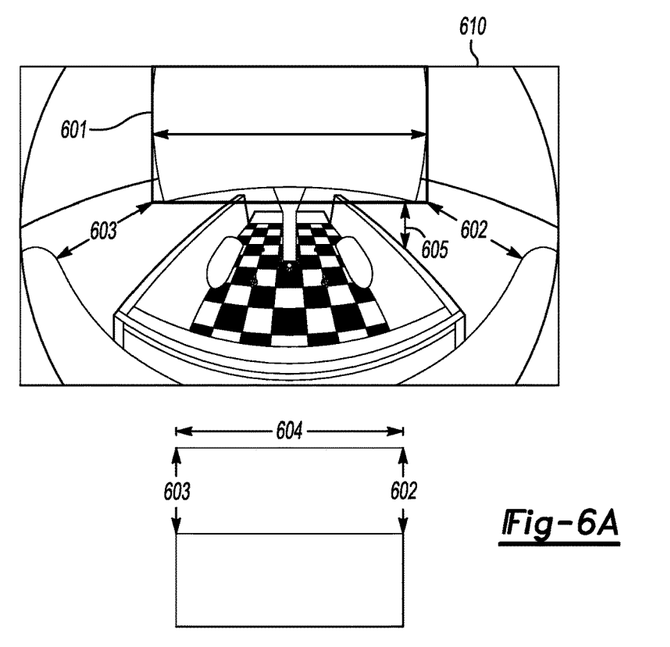
FIGS. 6A and 6B show illustrations for calculating an articulation angle of a trailer with respect to a centerline of a vehicle according to an aspect of an exemplary embodiment.
Figure 6B:
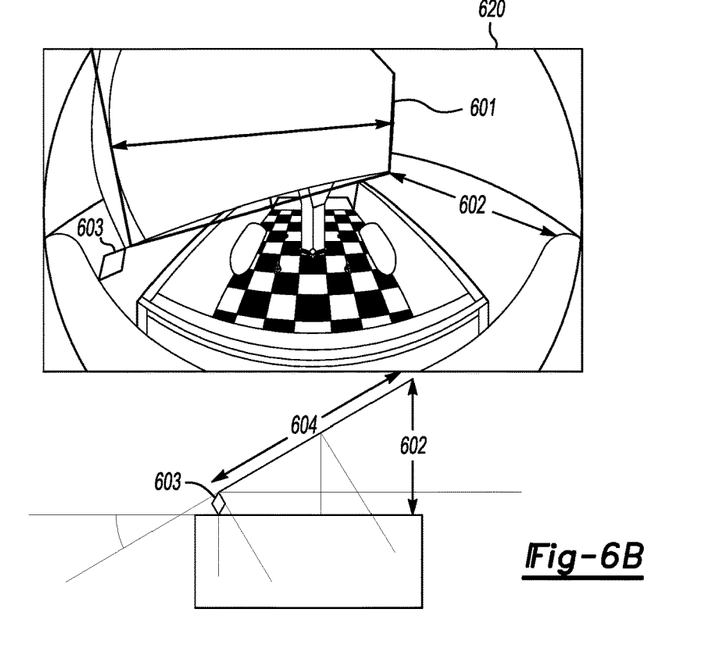

FIGS. 6A and 6B show illustrations for calculating an articulation angle of a trailer with respect to a centerline of a vehicle according to an aspect of an exemplary embodiment. Referring to FIG. 6A, a trailer 601 that is perpendicular with respect to a centerline through a vehicle is shown. In this image, a first distance 602 between the left side of a part of the vehicle and the left side of the trailer 601 and a second distance 603 between the right of a part of the vehicle and a right side of the trailer 601 are shown. The distances 602 and 603 are equal to each other or have predetermined values when the trailer 601 is perpendicular with respect to a centerline through the vehicle. Moreover, a height 605 of the trailer and a width 604 of the trailer may be known or calculated from the image 610.

Referring to FIG. 6B, the trailer 601 is no longer perpendicular with respect to a centerline through the vehicle due to movement of the trailer and the vehicle in image 620. Thus, the first and second distances 602 and 603 have changed. Based on the change in distances 602 and 603 the width of the trailer 604, an articulation angle of the trailer 601 with respect to a centerline through a vehicle may be calculated. Moreover, based on the width 604, the height 605, and the calculated articulation angle, it may be determined whether there is a risk of collision between the trailer 601 and a part of the vehicle. The operator of the vehicle may notified of the risk of collision The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for trailer recognition, the method comprising:
  detecting a face of a trailer based on a first image of the trailer taken at a first distance and generating a first bounding box around the detected face of the trailer in the first image;
  detecting the face of trailer based on a second image of the trailer taken at a second distance and generating a second bounding box around the detected face of the trailer in the second image;
  determining a first set of feature points in the first bounding box and a second set of feature points in the second bounding box that correspond to the first set of feature points;
  determining a correspondence between the first set of feature points and the second set of feature points and a correspondence between first corners of the first bounding box and second corners of the second bounding box; and
  estimating at least one dimension of the trailer by performing a least squares analysis to solve for three-dimensional real world coordinates of the first and second set of features points and the first and second corners of the first and second bounding boxes.

2. The method of claim 1, further comprising:
  determining an articulation angle of the trailer with respect to a line through a center of a vehicle based on the estimated at least one dimension.

3. The method of claim 2, wherein the determining the articulation angle comprises determining the articulation angle based on the estimated at least one dimension and a distance between the trailer and the vehicle, and
wherein the estimated at least one dimension comprises a width of the trailer.

4. The method of claim 3, wherein the distance is determined from an information provided by at least one from among an accelerometer, a speedometer, an ultrasonic sensor, an odometer, a radar sensor, and a wheel speed sensor.

5. The method of claim 2, wherein the determining the articulation angle comprises determining the articulation angle based on the three-dimensional real world coordinates.

6. The method of claim 1, wherein the estimated at least one dimension comprises a height and a width of the trailer.

7. The method of claim 1, further comprising:
receiving the first image of the trailer taken at the first distance and the second image of the trailer taken at the second distance from a camera facing a rear of the vehicle.

8. The method of claim 7, wherein the camera comprises a center high mount stop lamp (CHMSL) camera.

9. The method of claim 1, wherein the determining the correspondence between the first set of feature points and the second set of feature points comprises determining a rotation matrix corresponding to an articulation angle of the trailer with respect to a line through a center of the vehicle, and
wherein the correspondence between the first set of feature points and the second set of feature points and the correspondence between the first corners of the first bounding box and the second corners of the second bounding box is determined based on the rotation matrix.

10. A non-transitory computer readable medium comprising instructions executable by a computer to perform the method of claim 1.

11. An apparatus for trailer recognition, the apparatus comprising:
at least one memory comprising computer executable instructions; and
at least one processor configured to read and execute the computer executable instructions, the computer executable instructions causing the at least one processor to:
detect a face of a trailer based on a first image of the trailer taken at a first distance and generate a first bounding box around the detected face of the trailer in the first image;
detect the face of trailer based on a second image of the trailer taken at a second distance and generate a second bounding box around the detected face of the trailer in the second image;
determine a first set of feature points in the first bounding box and a second set of feature points in the second bounding box that correspond to the first set of feature points;
determine a correspondence between the first set of feature points and the second set of feature points and a correspondence between first corners of the first bounding box and second corners of the second bounding box; and
estimate at least one dimension of the trailer by performing a least squares analysis to solve for three-dimensional real world coordinates of the first and second set of features points and the first and second corners of the first and second bounding boxes.

12. The apparatus of claim 11, wherein the computer executable instructions cause the at least one processor to determine an articulation angle of the trailer with respect to a line through a center of a vehicle based on the estimated at least one dimension.

13. The apparatus of claim 12, wherein the computer executable instructions cause the at least one processor to determine the articulation angle by determining the articulation angle based on the estimated at least one dimension and a distance between the trailer and the vehicle, and
wherein the estimated at least one dimension comprises a width of the trailer.

14. The apparatus of claim 13, further comprising:
at least one from among an accelerometer, a speedometer, an ultrasonic sensor, an odometer, a radar sensor, and a wheel speed sensor,
wherein the computer executable instructions cause the at least one processor to determine the distance from an information provided by the at least one from among an accelerometer, a speedometer, an ultrasonic sensor, an odometer, a radar sensor, and a wheel speed sensor.

15. The apparatus of claim 11, wherein the computer executable instructions cause the at least one processor to determine the angle based on the three-dimensional real world coordinates.

16. The apparatus of claim 11, wherein the estimated at least one dimension comprises a height and a width of the trailer.

17. The apparatus of claim 11, further comprising:
a camera facing a rear of the vehicle,
wherein the computer executable instructions cause the at least one processor to receive the first image of the trailer taken at the first distance and the second image of the trailer taken at the second distance from the camera.

18. The apparatus of claim 17, wherein the camera comprises a center high mount stop lamp (CHMSL) camera.

19. The apparatus of claim 11, wherein the computer executable instructions cause the at least one processor to determine the correspondence between the first set of feature points and the second set of feature points by determining a rotation matrix corresponding to an articulation angle of the trailer with respect to a line through a center of the vehicle, and
wherein the correspondence between the first set of feature points and the second set of feature points and the correspondence between the first corners of the first bounding box and the second corners of the second bounding box is determined based on the rotation matrix.

20. The apparatus of claim 11, wherein the computer executable instructions cause the at least one processor to estimate at least one dimension of the trailer based on a focal length of a camera that captured the first image and the second image.

* * * * *